United States Patent [19]

Mitchell

[11] Patent Number: 4,777,075

[45] Date of Patent: Oct. 11, 1988

[54] ELECTROGRAPHIC LIQUID APPLICATOR HEAD AND FABRICATION METHOD THEREFOR

[75] Inventor: John D. Mitchell, Webster, N.Y.

[73] Assignee: Eastman Kodak Company, Rochester, N.Y.

[21] Appl. No.: 788,269

[22] Filed: Oct. 17, 1985

[51] Int. Cl.[4] .................................................. B32B 3/10

[52] U.S. Cl. .................................... 428/136; 428/137; 428/138; 428/201; 118/660

[58] Field of Search ................ 118/660; 428/137, 136, 428/138, 201; 355/10

[56] References Cited

U.S. PATENT DOCUMENTS 4,244,321 1/1981 Plumadore ...................... 118/660 X 4,313,992 2/1982 Spiewok ......................... 428/137 X

*Primary Examiner*—Alexander S. Thomas

*Attorney, Agent, or Firm*—John D. Husser

[57] ABSTRACT

An electrographic liquid applicator head is inexpensively but precisely fabricated by adhering a flat base member, in which grooves are molded or cast, to a thin, photofabricated cover member. The adhesive isolates the supply gutters of the base and supply slits of the cover from adjacent drain slits and gutters. In a preferred embodiment the surface of the cover member is held in a suitably planar position by a planar surface on a magnetic chuck.

3 Claims, 1 Drawing Sheet

ELECTROGRAPHIC LIQUID APPLICATOR HEAD AND FABRICATION METHOD THEREFOR

BACKGROUND OF THE INVENTION

1. Field of the Invention

The present invention pertains to devices for applying a liquid composition to the surface of an image member in an electrographic processor.

2. Description of the Prior Art

Multiple-slit liquid applicator heads for electrographic image processors, such as the heads described in U.S. Pat. Nos. 3,407,786 and 3,929,099 are well-known. Such heads comprise a base member connected to a supply of a liquid composition, and a cover member. The base member has interlaced supply and drain grooves separated by raised lands. The cover member has perforations through which the liquid composition flows from the supply grooves to the drain grooves.

Hitherto, the manufacture of these heads has required expensive machining techniques to provide the precise control of the liquid flow pattern produced by the head. This precise control is necessary to prevent streaking and mottling of the images developed by the processor. The perforations in the surface of these heads must be accurately formed. The surface must also be precisely flat. If these conditions are met the pressure of the liquid between the applicator head and an image member moving across the head can maintain the image member at a uniform distance from the head. A distance within the range of 0.5 to 2 mm is generally optimum. If this distance is uniform, the effect of the applicator head on the image memer's electrostatic charge and the quantity of the developer provided by the applicator head to the image member will be uniform.

The surface of the applicator heads should be made of a corrosion and abrasion-resistant material and preferably are electrically conductive. Stainless steel sheet has been used, but stainless steel sheet thick enough to provide a rigid planar surface must be cut or punched and then machined to assure that the cut or punched sheet provides a smooth, planar surface.

SUMMARY OF THE INVENTION

One significant purpose of the present invention is to provide simplified fabrications for such electrographic applicators.

In one aspect the present invention provides an applicator comprising a flexible cover member having a plurality of perforations adapted to permit the developing liquid flow; a base member connectible to a supply of developing liquid and adapted to transport such liquid to the perforations of the cover member; and a settable plastic material between said members that supports the surface of the cover member in a planar configuration on the base member.

In one preferred method aspect of the present invention a cover member of an applicator head is placed on a magnetic chuck. A settable plastic material is applied between the cover and base members and the plastic material is then pressed between the two members. The surface of the cover member is held in a suitably planar configuration by the chuck while the plastic materail sets. The adhesive holds the cover member on the base member in a planar orientation and isolates the liquid flow between the supply grooves and the entry slots from the liquid flow between the exit slots and drain grooves.

The cover member of an applicator head in accordance with the present invention can be made of a thin sheet of metal and is thus well-suited to photofabrication methods. Photofabrication of the cover member is less expensive than comparable machine fabrication methods. The planarity of the cover member is assured by the planar surface on the lands provided by the settable plastic material.

The invention, its objects and advantages will be more clearly understood when the description of a preferred embodiment below is considered in conjunction with the figures provided.

BRIEF DESCRIPTION OF THE DRAWING

In the description of a preferred embodiment below, reference is made to the accompanying drawing, in which.

DETAILED DESCRIPTION OF A PREFERRED EMBODIMENT

Figure 1:
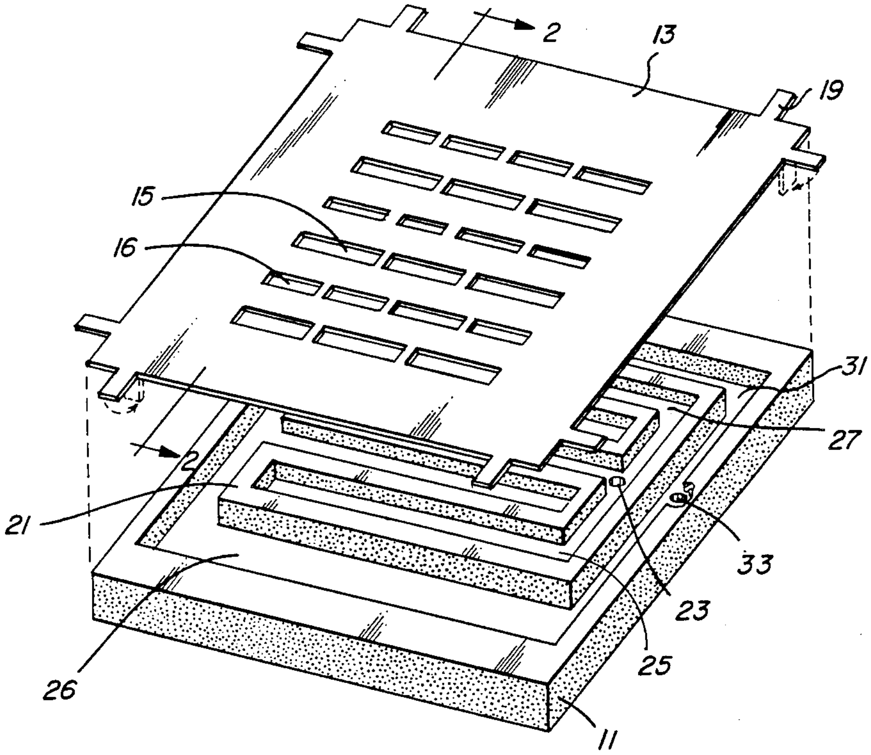
FIG. 1 is an exploded view of a liquid applicator head in accordance with the present invention.

With reference to FIG. 1, one preferred applicator head embodiment comprises a base member 11 and a thin, photofabricated cover member 13. The base member 11 may be inexpensively molded or cast of a suitable rigid material, e.g. a rigid styrene plastic; and includes interlaced supply grooves 25, 27 and drain grooves 29, 31, respectively coupled to input port 23 and drain port 33. A land portion 21 separates the grooves.

The cover member 13 is made of a thin sheet of a suitable electrically conductive material, here a 0.254 mm thick sheet of a ferromagnetic, stainless steel alloy. The cover member has a pattern of perforations, alternate rows of supply slits 15 and drain slits 16. To produce a precise slit pattern, one side of a sheet of metal is coated with a photo-resist material. A mask pattern providing the plurality of slits is photographically printed and developed in the photo-resist material. The slit areas of the sheet, left uncovered by the mask, are then etched away.

Figure 2:
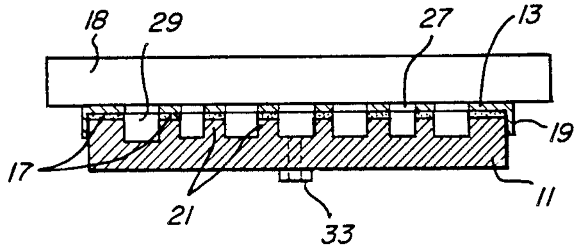
FIG. 2 is a cross-section view of a magnetic chuck and the head shown in FIG. 1.

FIG. 2 shows such applicator head in the finalstages of assembly in accordance with the present invention. To assemble an applicator head, a gap-filling, settable adhesive 17 is applied to one side of cover member 13 with a roller. An example of such adhesive is epoxy resin. In general, such adhesives should be insoluble in the developer liquid and should not contract on setting. The other side of a cover member 13 is placed on a preferably planar magnetic chuck 18, which holds cover member 13 against the chuck surface such that the cover member conforms to the suitably planar surface of this chuck. Locator tabs 19 at the corners of cover member 13 are bent to form a right angle with cover member 13. The grooved side of base member 11 is then placed between the tabs 19, assuring correct alignment with the cover member 13, and the base member is pressed onto the resin 17, as shown in FIG. 1.

The epoxy resin used is preferably a thixotropic adhesive resin, which fills any gaps between the lands 21 on base member 11 and the planarized cover member 13. When the resin has hardened and the cover member 13 is released from the chuck, the resin on the lands 21 provides a permanent reference surface holding the cover member in the planar configuration established by chuck 17. Thee resin also seals the applicator head so that liquid entering through input port 23 and passing from the supply grooves 25, 27 to the supply slits 15 is kept separate from the liquid that enters the head through the drain slits 16 and passes through drain grooves 29, 31 to the drain port 33.

The invention has been described in detail with particular reference to a presently preferred embodiment thereof, but it will be understood that variations and modifications can be effected within the spirit and scope of the invention.

I claim:

1. An electrographic applicator head for applying a liquid composition to the surface of an electrographic image member, comprising:

a cover member formed of a flexible material and having a plurality of supply and drain slits constructed to permit developer liquid to flow therethrough;

a rigid base member connectible to a supply of developer liquid, said base member having supply and drain grooves respectively constructed to transport such liquid to and from said cover member supply and drain slits and having support surfaces for generally referencing the orientation of said cover member; and an adhesive material layer coupling said members, said layer having a thickness which varies in a manner that references said cover member precisely in a predetermined orientation.

2. An electrographic applicator head for applying a liquid developer composition to the surface of an electrographic image member movable relative to said head, comprising:

a flexible cover member having a surface adapted to lie in closely-spaced relationship to the surface of said image member, said cover member having a plurality of photofabricated, supply and return openings in said surface constructed to permit the liquid to flow through said cover member;

a molded or cast base member connectible to a supply of said liquid composition, said base member being constructed with means defining passages for supplying and returning the liquid to and from said cover member supply and return openings and having support surfaces for generally referencing the orientation of said cover member; and an adhesive material layer attaching said cover member to said base member, said adhesive material layer having a variable thickness between said members such that said surface of said cover member is held in a precisely planar configuration.

3. An applicator head as claimed in claim 2 wherein:

said openings comprise supply slits and drain slits;

said base member has interleaved supply and drain grooves with intervening land portions; and said adhesive material layer occupies areas between the land portions and said cover member such that the flow of the liquid between said supply grooves and said supply slits is isolated from the flow of the liquid composition between said drain slits and said drain grooves.

* * * * *